UNITED STATES PATENT OFFICE.

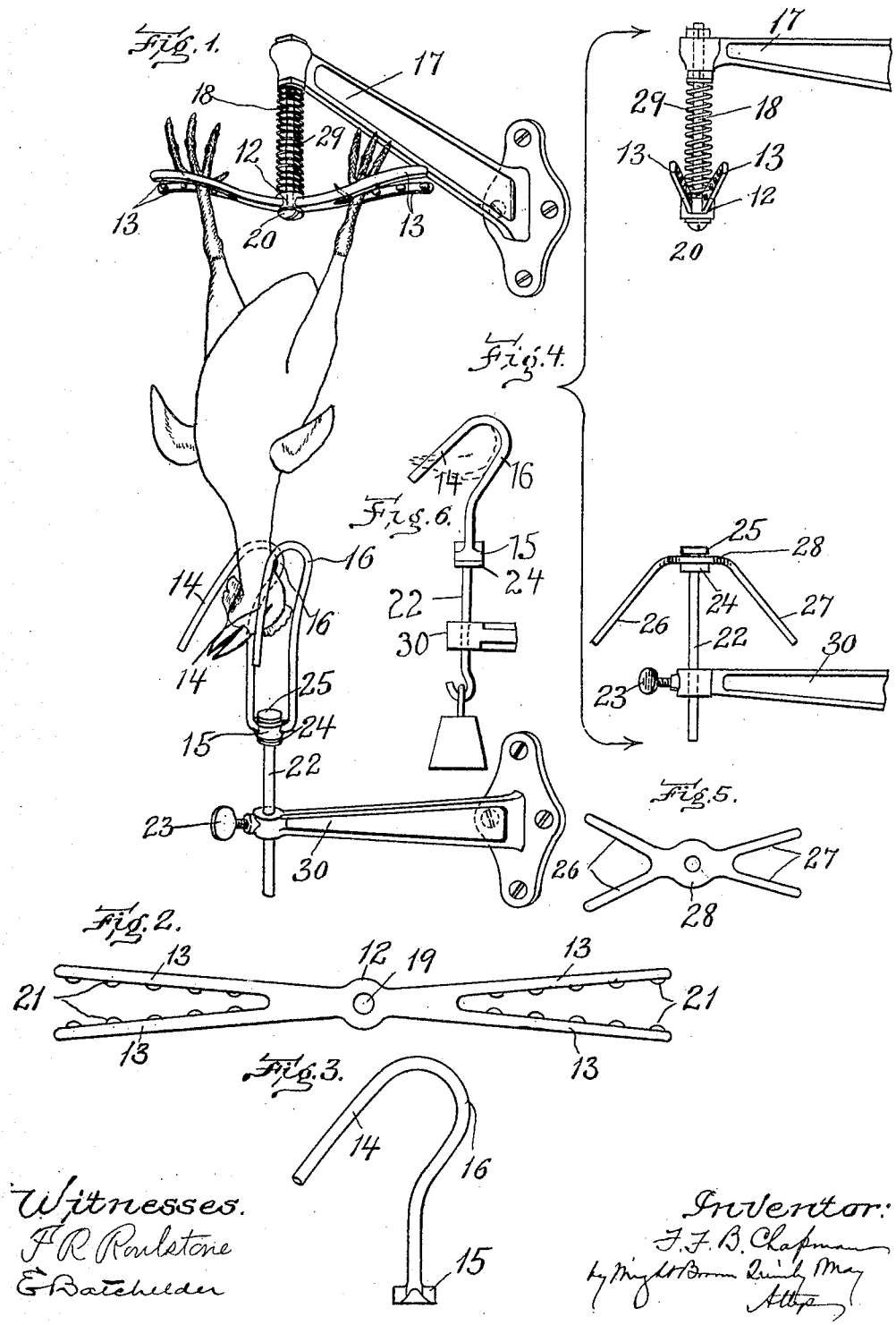

FRANK F. B. CHAPMAN, OF WINCHESTER, MASSACHUSETTS.

POULTRY-PICKING FRAME.

No. 925,993.    Specification of Letters Patent.    Patented June 22, 1909.

Application filed March 24, 1909. Serial No. 485,526.

*To all whom it may concern:*

Be it known that I, FRANK F. B. CHAPMAN, of Winchester, in the county of Middlesex and State of Massachusetts, have invented certain new and useful Improvements in Poultry-Picking Frames, of which the following is a specification.

This invention has for its object to provide a frame or appliance adapted to support an unpicked fowl in convenient position for picking, and in such manner that the operator can obtain convenient access to all parts of the body of the fowl, the skin, particularly that of the breast, being so held and controlled that the liability which often exists of tearing the skin at this portion in pulling the feathers therefrom, is obviated.

The invention consists in the improvements which I will now proceed to describe and claim.

Of the accompanying drawings, forming a part of this specification,—Figure 1 represents a perspective view of a fowl-picking frame embodying my invention. Fig. 2 represents a top plan view of the upper member, hereinafter referred to. Fig. 3 represents a side elevation of the lower member. Fig. 4 represents a partial side elevation showing a lower member having two interchangeable neck-engaging openings. Fig. 5 represents a top plan view of the lower member shown in Fig. 4. Fig. 6 represents a partial side view showing a modification.

The same reference characters indicate the same parts in all the figures.

My improved poultry picking frame includes an upper and a lower member, the upper member being formed to simultaneously engage the two legs of a fowl and hold the same spaced apart, and suitably separated from the intermediate portion of the body, while the lower member is formed to engage the neck of the fowl just above the head, and confine the head against loose movement in any direction, with the neck under suitable tension so that the breast skin is held taut, and is free from liability of being torn during the picking operation.

The upper member comprises a central portion or hub 12, and two pairs of divergent arms 13 projecting in opposite directions therefrom, said arms forming tapering or V-shaped openings which are open at the opposite ends of the member, said openings being so proportioned that they are adapted to receive the legs of a fowl immediately adjoining the claws, the latter forming protuberances which bear upon the upper edges of the arms. The arms 13 are preferably inclined upwardly from the hub 12, their outer ends being somewhat higher than the hub, as indicated in Fig. 1.

The neck-engaging member comprises two divergent arms 14 forming a tapering or V-shaped opening which is widest at its open outer end portion, the inner end portion of the opening being contracted and formed to bear upon the sides of the neck of the fowl at the junction of the neck with the head, the contracted portion being narrower than the head, so that the latter is confined securely. The arms 14 are inclined downwardly from the contracted portion to the open end of the opening, so that they bear against the under side of the head and prevent the latter from swinging horizontally outward.

As shown in Figs. 1 and 3, the neck-engaging member is composed of bent wire arms connected by a hub or collar 15, the portions 16 of said arms which form the contracted inner portion of the V-shaped opening, being in closer proximity to each other than the inclined portions which form the sides of the opening, the distance between said portions 16 being such that the head of the fowl cannot pass backwardly between said portions.

The upper member is preferably supported by a fixed bracket 17 having a downwardly projecting stud 18 on which the said member is swiveled, the hub of said member having an orifice 19 through which the stud passes, and the stud having a head 20 bearing on the under side of the hub. To prevent undesirably loose rotation of the upper member on the stud 18, I provide the latter with a brake which may be a spiral spring 29 interposed between the bracket and the upper side of the hub 12, and exerting yielding pressure on the latter. The inner sides of the arms 13 are preferably provided with protuberances 21 arranged in pairs and separated by intermediate portions of the said inner sides, as shown in Fig. 2, each pair of protuberances being adapted to form a stop to prevent the engaged leg from slipping outwardly toward the mouth of the opening. It will be seen that each pair of protuberances and the adjacent side portions of the arms at the inner sides of the protuberances constitute a socket adapted to engage the leg of a fowl, the leg bearing against the sides of the arms between the protuberances, and also bearing against the protuberances which are between the leg and the outer end of the V-shaped opening.

The neck-engaging member is preferably supported by a fixed bracket 30 and a stud 22 passing through a socket in the outer end of the bracket, and adjustably secured therein by a thumb screw 23, provision being thus made for adjusting the neck-engaging member toward and from the upper member to adapt the frame to fowls of different sizes. The stud 22 has a fixed collar 24 and a head 25 which confine the hub 15, the latter being free to turn on the stud 22. The studs 18 and 22 are substantially in alinement with each other, so that the engaging members and the fowl engaged therewith are adapted to rotate on a common axis, thus enabling all parts of the body of the fowl to be brought to the front. If desired, the stud 22 may be movable endwise in the bracket 30 instead of being positively engaged therewith, the stud being suitably weighted so that it will exert a downward pull on the head and neck of the fowl, as shown in Fig. 6.

In Figs. 4 and 5, I show a neck-engaging member having two pairs of neck-engaging arms 26 and 27 located at opposite sides of a central hub 28 which is adapted to turn on the stud 22. The V-shaped opening formed by the arms 26 is of larger capacity than the V-shaped opening formed by the arms 27, one opening being adapted to engage the necks of relatively large fowls, while the other is adapted to engage the necks of smaller fowls. The two pairs of arms are adapted to be used interchangeably.

I do not limit myself to the specific form of construction shown and described, since the details of construction may be modified without departing from the spirit of my invention.

I claim:

1. A poultry-picking frame, comprising a pair of engaging members, one adapted to simultaneously engage the legs of a fowl and hold the same apart, while the other is adapted to engage the neck of the fowl, and means for supporting the members at different distances from each other.

2. A poultry-picking frame, comprising a pair of engaging members mounted to turn on axes in substantial alinement with each other, one of the members being adapted to simultaneously engage the legs of a fowl and hold the same apart, while the other member is adapted to engage the neck of the fowl, and means supporting the members at different distances from each other.

3. A poultry-picking frame, comprising a pair of engaging members, one having two pairs of divergent leg-engaging arms forming oppositely tapering V-shaped openings, while the other has a pair of divergent neck-engaging arms which are inclined relatively to the leg-engaging arms, and means for supporting the members at different distances from each other.

4. A poultry-picking frame, comprising an upper member having two pairs of divergent leg-engaging arms forming oppositely tapering V-shaped openings, and a lower member having a pair of divergent neck-engaging arms forming a V-shaped opening, the contracted inner portion of which is formed to bear on the sides of the engaged neck, the said arms being inclined relatively to the leg-engaging arms.

5. A poultry-picking frame, comprising fixed upper and lower brackets having studs substantially in alinement with each other, an upper member swiveled on the upper stud, and having two pairs of divergent leg-engaging arms, forming oppositely tapering V-shaped openings, and a lower member swiveled on the lower stud, and having a pair of divergent neck-engaging arms inclined relatively to the arms of the upper member, and forming a V-shaped opening which has a contracted inner portion formed to bear on the sides of the engaged neck.

6. A poultry-picking frame, comprising fixed upper and lower brackets having studs substantially in alinement with each other, an upper member swiveled on the upper stud, and having two pairs of divergent leg-engaging arms forming oppositely tapering V-shaped openings, a brake device on the upper stud adapted to yieldingly resist rotation of the member thereon, and a neck-engaging member swiveled on the lower stud.

7. A poultry-picking frame, comprising fixed upper and lower brackets having studs substantially in alinement with each other, an upper member swiveled on the upper stud, and having two pairs of divergent leg-engaging arms, forming oppositely tapering V-shaped openings, and a lower member swiveled on the lower stud, and having a pair of divergent neck-engaging arms inclined relatively to the arms of the upper member, and forming a V-shaped opening which has a contracted inner portion formed to bear on the sides of the engaged neck, the lower stud and the neck-engaging member being adjustable toward and from the upper member.

8. A poultry-picking frame, comprising a swiveled upper member, and a reversible swiveled neck-engaging member having two pairs of divergent arms forming two V-shaped openings of different sizes and adapted to be used interchangeably.

In testimony whereof I have affixed my signature, in presence of two witnesses.

FRANK F. B. CHAPMAN.

Witnesses:
E. BATCHELDER,
P. W. PEZZETTI.